United States Patent [19]

Simonsen et al.

[11] Patent Number: 5,232,084
[45] Date of Patent: Aug. 3, 1993

[54] CONVEYOR BELT FOR A TUBULAR CONVEYING DEVICE

[75] Inventors: Harald Simonsen, Springe; Klaus Rickert, Northeim, both of Fed. Rep. of Germany

[73] Assignee: Continental Aktiengesellschaft, Hanover, Fed. Rep. of Germany

[21] Appl. No.: 852,177

[22] PCT Filed: Jun. 26, 1991

[86] PCT No.: PCT/DE91/00521
§ 371 Date: Apr. 1, 1992
§ 102(e) Date: Apr. 1, 1992

[87] PCT Pub. No.: WO92/02439
PCT Pub. Date: Feb. 20, 1992

[30] Foreign Application Priority Data

Aug. 1, 1990 [DE] Fed. Rep. of Germany ....... 4024359

[51] Int. Cl.⁵ ............................................. B65G 15/08
[52] U.S. Cl. .................................................... 198/819
[58] Field of Search .......................... 198/819

[56] References Cited

FOREIGN PATENT DOCUMENTS

| 0050962 | 5/1982 | European Pat. Off. . |
| 3741537 | 6/1988 | Fed. Rep. of Germany . |
| 8905765 | 6/1989 | PCT Int'l Appl. . |
| 2152000 | 7/1985 | United Kingdom . |

*Primary Examiner*—D. Glenn Dayoan
*Attorney, Agent, or Firm*—Robert W. Becker & Associates

[57] ABSTRACT

A conveyor belt for a tubular conveying device is formed of rubber or plastic material with rubber-like characteristics. The conveyor belt has embedded therein reinforcement layers of fabric and wire cable. The conveyor belt is guided within the conveying device such that the conveyor belt in its longitudinal direction forms an oval tube. In the transverse direction the conveyor belt includes a center section, a first and a second end section with intermediate sections being arranged between the center section and the respective end sections. The intermediate sections have a transverse bending resistance that is smaller than a bending resistance of the center section and, when the oval tube is formed, the end sections form an overlap portion having a bending resistance that is greater than the bending resistance of the intermediate sections.

17 Claims, 2 Drawing Sheets

CONVEYOR BELT FOR A TUBULAR CONVEYING DEVICE

BACKGROUND OF THE INVENTION

The present invention relates to a conveyor belt according to the preamble of claim 1.

A tubular conveying device is known from DE-A-37 41 537 in which the tubular closed, conveyor belt exhibits an oval cross-section due to the respective arrangement of supporting and guiding rollers. Guiding the closed conveyor belt in the form of an oval cross-section is designed to prevent undesired twisting of the conveyor belt which may occur in curved portions of the device. With a control guiding of the conveyor belt, which is closed by overlapping the end sections, the respective guide rollers may be adjusted such that the overlap portion of the end sections of the conveyor belt are always covered by one of the guiding rollers.

The advantageous oval guiding of the conveyor belt serves the purpose of improving the belt guiding function as well as the reduction of undesired twisting along the conveying path. The oval cross-section of the closed conveyor belt is accomplished by the constructive arrangement of the supporting and guiding rollers. Due to the respective arrangement of the supporting and guiding rollers any form of ovalness up to a true elliptical shape may be achieved. The conveying belt which is folded over to form the closed tube is forced into the oval cross-sectional shape due to the constructive arrangement and embodiment of the guiding device receiving the supporting and guiding rollers. However, an accidental twisting of the conveyor belt may not be prevented entirely It is therefore an object of the invention to provide a conveyor belt of the aforementioned kind which may be easily guided on the conveying path after assuming the oval belt cross-section in order to prevent undesired twisting.

SUMMARY OF THE INVENTION

This object is inventively solved by the following features: the conveyor belt is comprises of a material selected from the group consisting of rubber and plastic material with rubber-like characteristics; has embedded therein reinforcement means of materials selected from the group consisting of fabric and metal; is guided within the conveying device such that the conveyor belt in its longitudinal direction forms an oval tube; is comprised of a center section, a first and a second end section in a direction transverse to the longitudinal direction, with a first intermediate section arranged between the first end section and the center section and a second intermediate section arranged between the second end section and the center section, the first and second intermediate sections having a transverse bending resistance that is smaller than a bending resistance of the center section, and, when the oval tube is formed, the end sections forming an overlap portion having a bending resistance that is greater than the bending resistance of the intermediate sections.

Accordingly, the conveyor belt of the present invention is comprised of a material selected from the group consisting of rubber and plastic material with rubber-like characteristics and the conveyor belt has embedded therein reinforcement means of materials selected from the group consisting of fabric and metal. The conveyor belt is guided within the conveying device such that the conveyor belt in its longitudinal direction forms an oval tube. The conveyor belt, in a direction transverse to the longitudinal direction, is comprised of a center section, a first and a second end section, with a first intermediate section being arranged between the first end section and the center section and a second intermediate section is arranged between the second end section and the center section. The first and second intermediate sections have a transverse bending resistance that is smaller than a bending resistance of the center section, and, when said oval tube is formed, the end sections form an overlap portion with a bending resistance that is greater than the bending resistance of the intermediate sections.

The stiff center section of the conveyor belt has adjacent intermediate sections having a smaller transverse bending resistance. These intermediate sections form, in the tubular closed state of the conveyor belt, bendable side portions and thus favorably support the oval cross-section of the conveyor belt while the end sections arranged adjacent to the intermediate sections form an overlap portion which, due to the frictional connection between the end sections, is again bending resistant in a transverse direction. The bendable intermediate section allow the adjustment of smaller radii of curvature so that the oval or elliptical belt cross-section may be achieved with little resistance.

The oppositely arranged center section and the overlap portion are thus connected to one another by bendable side portions. This arrangement allows for an active guidance of the closed conveyor belt since the conveyor belt, due to its construction, easily conforms to the desired oval belt cross-section. Due to the arrangement of the transporting and guiding rollers, the predetermined position of the oval shape is easily adapted by the closed conveyor belt without twisting since the conveyor belt due to its construction is provided with different zones of resistance about its circumference and thus automatically conforms to the position of the oval which is determined by the transporting and guiding rollers. Thus, an active guiding of the conveyor belt in the desired position is possible.

In an advantageous embodiment of the invention at least a portion of the end sections has a bending resistance that is greater than the bending resistance of the intermediate sections. Accordingly, at least a portion of the end sections have a bending resistance that is greater than the bending resistance of the intermediate sections. When the end sections which are immediately adjacent to the intermediate sections are provided with a higher bending resistance than the intermediate sections, it is possible for a greater width of the conveyor belt to still provide a good guiding of the closed conveyor belt.

In an advantageous embodiment of the invention, the transverse bending resistance of the intermediate sections is 45 to 70% of the bending resistance of the center section and the bending resistance of the portion of the end section is 60 to 80% of the bending resistance of the center section. The end sections and the intermediate sections which are arranged symmetrically relative to the center section are favorably adjusted by the above-mentioned selection of the transverse bending resistance within the named sections in order to accomplish the desired oval cross-section.

In a further advantageous embodiment of the invention, the bending resistance of the intermediate zones is approximately 55% of the bending resistance of the center section and the bending resistance of the end sections is approximately 65% of the bending resistance of the center section. These selected values have proven successful in practice since therewith the common applications of tubular conveying devices are covered.

In another advantageous embodiment of the invention, the end sections, over the entire transverse width, have a greater bending resistance than the intermediate sections.

According to a further embodiment, it is suggested that outwardly oriented portions of the end sections have a smaller transverse bending resistance than portions adjacent to the intermediate section. This embodiment is advantageous because the free ends of the conveyor belt will easily conform to the tubular closed shape of the conveyor belt body.

The belt behavior with respect to conforming to an oval cross-section is favored by the width of the individual transverse belt sections defined as follows: the center section corresponds to 20 to 40% of the width of the conveyor belt, the intermediate sections together correspond to 15 to 25% of said width, and the end sections together correspond to 40 to 60% of said width. Preferably, the center section corresponds to 30% of the width of the conveyor belt, the intermediate sections together correspond to 20% of said width, and the end sections together correspond to 50% of said width. Accordingly, the center section corresponds to 20 to 40% of the width of the conveyor belt, the intermediate sections together correspond to 15 to 25% of the width, and the end sections together correspond to 40 to 60% of the width. Preferably, the center section corresponds to 30% of the width of the conveyor belt, the intermediate sections together correspond to 20% of the width, and the end sections together correspond to 50% of the width.

In another advantageous embodiment of the invention, the reinforcement means are comprised of a first fabric layer extending over the center section and a second fabric layer extending over the center section and the intermediate sections and at least partially into the end sections. Accordingly, belt cross-section has a fabric layer in the center section, above which a further fabric layer is arranged extending into the two end sections. It is preferable that, when the oval tube is formed, the first reinforcement layer is radially outwardly positioned relative to the second reinforcement layer. The realization of different zones of varying bending resistance is achieved in a simple manner. The end sections may be additionally reinforced.

According to a further embodiment, the reinforcement means are further comprises of a layer of wire cables arranged over the width of the end section for transmitting pulling forces. In the area where the wire cables and the fabric layer extending into the end section overlap, an increase of the transverse bending resistance relative to the intermediate sections is achieved in a simple manner. An additional reinforcement of the end sections is thus obsolete.

In order to provide softer free ends to the end sections to have them conform to the remaining belt body more easily, the upper fabric layer extends only partially into the end sections.

The invention provides a conveyor belt for a tubular conveying device which, due to its construction, may easily be closed to a tubular shape of an oval cross-section. The mechanical guiding devices which are designed to maintain the oval cross-section now serve only to guide and hold the oval belt cross-section and are not used anymore to force the conveyor belt into the oval cross-sectional shape.

This is advantageous because the service life of the conveyor belt is increased and an improved guidance over the entire conveying path is insured. Due to the inventive embodiment, the guiding forces are also increased. Due to the irregular transverse bending resistance of the conveyor belt, it conforms preferably to the oval shape which results in an improved guiding of the closed conveyor belt without undesired twisting.

BRIEF DESCRIPTION OF THE DRAWINGS

With the aid of the drawing an embodiment of the invention will be explained in detail in the following. It is shown in.

DESCRIPTION OF PREFERRED EMBODIMENTS

Figure 1:
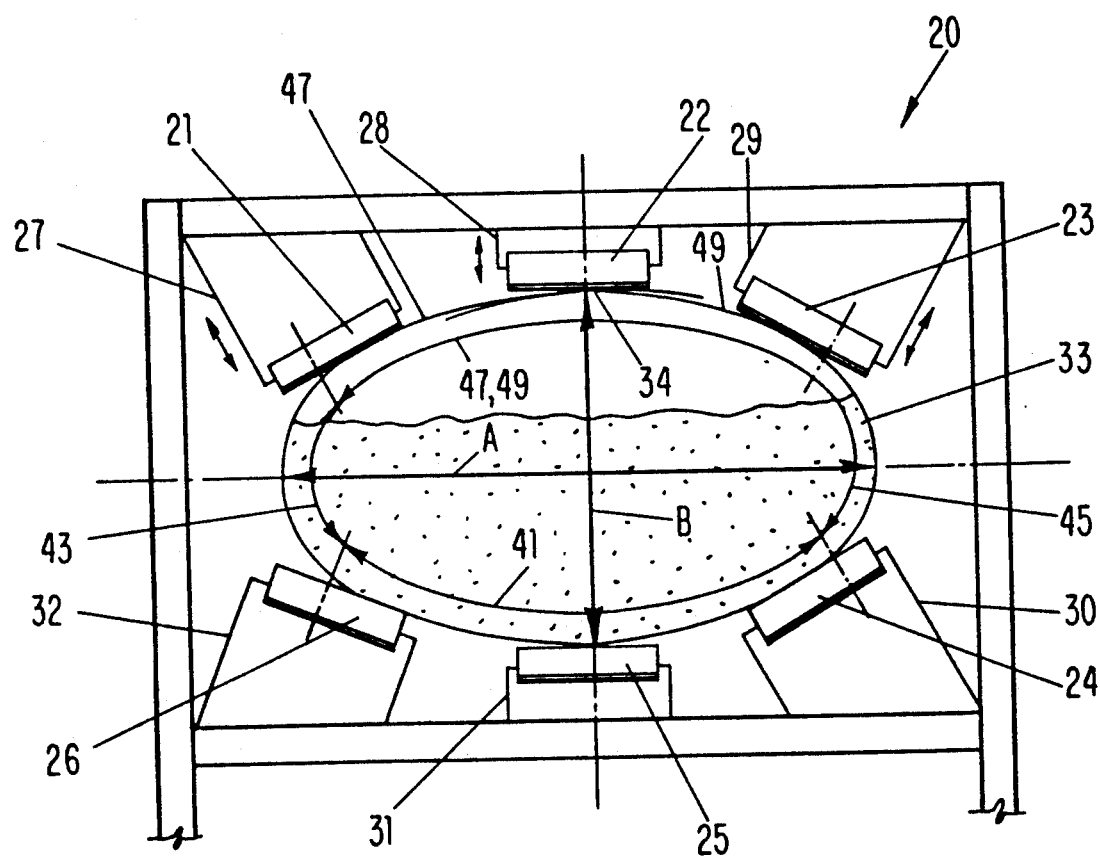
FIG. 1 represents a cross-sectional view of a tubular conveyor belt guided by fixedly mounted supporting and guiding rollers attached to a frame, whereby the conveyor belt has an oval cross-section.

The tubular conveying device 20 represented in FIG. 1 is comprised of stationary supporting and guiding rollers 21, 22, 23, 24, 25, 26 which are held in respective holders 27, 28, 29, 30, 31, 32. For adjustment purposes, the supporting and guiding rollers 21 to 26 are radially adjustable in the direction toward the conveyor belt 33. By adjusting an individual or all of the supporting in guiding rollers 21 to 26, any ovalness and any position of the conveyor belt 33 may be accomplished. The conveyor belt 33 is closed to a tubular shape of an oval cross-section whereby an overlap portion 34 is covered by a guiding roller 22.

The ovalness of the conveyor belt 33 is determined by its horizontal major axis A and its minor axis B. The filling of the enclosed material to be transported fills the cross-section of the conveyor belt to approximately $\frac{3}{4}$.

With respect to the cross-section, a lower, bending resistant center section 41 is provided. On either side of the center section 41 intermediate sections 43, 45 of the conveyor belt tube 33 are arranged which have a smaller radius of curvature than the center sections 41 and form a transition into the end sections 47, respectively, 49 which again have a greater radius of curvature. The end sections 47 and 49 of the conveyor belt 33 overlap with one another in the overlap portion 34 of the tubular closed conveyor belt 33.

Figure 2:
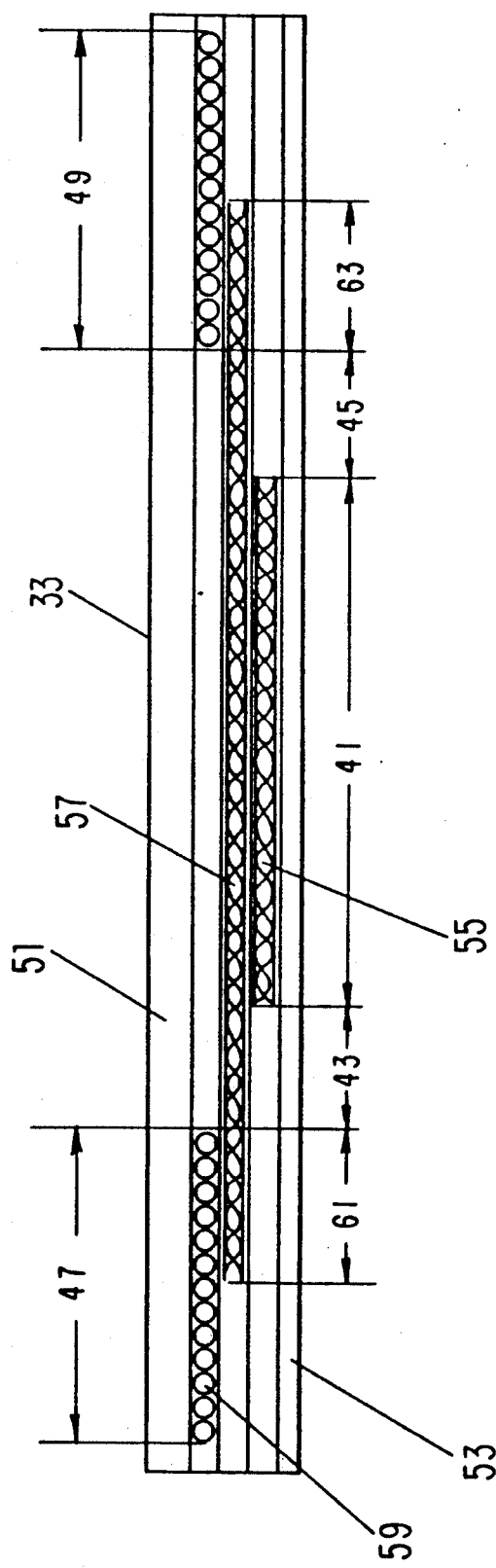
FIG. 2 shows a cross-sectional view of the conveyor belt when placed on a flat surface.

FIG. 2 represents the conveyor belt 33 when placed on a flat surface. The elastomer matrix of the conveyor belt 33 is comprised of rubber layers and is limited by rubber plates 51 and 53 at its upper and lower end. In the center a fabric layer 55 is embedded which essentially defines the center section 41. On top of this fabric layer 55 which a further fabric layer 57 is placed which extends over a greater width and with an intermediate layer in teh form of a common skim layer of hard rubber being interposed therebetween. Within the two end sections 47 and 49 a plurality of parallel adjacent wire cables 59 is embedded and extends longitudinally in order to transmit pulling forces. The fabric layer 57 ends approximately at half the width of the respective layer of wire cables 59.

Due to this construction a plurality of zones of different transverse bending resistance is provided over the belt cross-section. Adjacent to the center section 41, short intermediate sections 43 and 45 are positioned in which only the second fabric layer 57 is provided as an reinforcement means. Next to the two intermediate sections 43 and 45, the end sections 47 and 49 are positioned which are again divided into two portions of a different transverse bending resistance. In the inwardly oriented portion adjacent to the intermediate sections 43, 45, fabric layer 57 and the layer of wire cable 59 are arranged atop one another so that a zone with a greater transverse bending resistance as compared to the transverse bending resistance of the intermediate sections 43 and 45 is provided. The outwardly oriented portions of the end sections 47 and 49 have only the layer of wire cables 59 so that here the transverse bending resistance is smaller.

The present invention is, of course, in no way restricted to the specific disclosure of the specification and drawings, but also encompasses any modifications within the scope of the appended claims.

We claim:

1. A conveyor belt for a tubular conveying device, said conveyor belt being comprised of a material selected from the group consisting of rubber and plastic material with rubber-like characteristics;
    said conveyor belt having embedded therein reinforcement means of materials selected from the group consisting of fabric and metal;
    said conveyor belt being guided within the conveying device such that said conveyor belt in its longitudinal direction forms an oval tube;
    said conveyor belt, in a direction transverse to said longitudinal direction, being comprised of a center section, a first and a second end section, with a first intermediate section being arranged between said first end section and said center section and a second intermediate section being arranged between said second end section and said center section, said first and second intermediate sections having a transverse bending resistance that is smaller than a bending resistance of said center section, and, when said oval tube is formed, said end sections forming an overlap portion having a bending resistance that is greater than said bending resistance of said intermediate sections;
    at least a portion of said end sections having a bending resistance that is greater than said bending resistance of said intermediate sections, with said bending resistance of said intermediate sections being 45 to 70% of said bending resistance of said center section, and said bending resistance of said portion of said end sections being 60 to 80% of said bending resistance of said center section.

2. A conveyor belt according to claim 1, wherein said bending resistance of said intermediate sections is 55% of said bending resistance of said center section, and said bending resistance of said portion of said end sections is 65% of said bending resistance of said center section.

3. A conveyor belt according to claim 1, wherein said bending resistance of said end sections, over their entire width in said transverse direction, is greater than said bending resistance of said intermediate sections.

4. A conveyor belt according to claim 1, wherein said end sections are comprised of an outwardly oriented portion and a portion adjacent to said intermediate sections, said outwardly oriented portion having a smaller bending resistance than said portion adjacent to said intermediate sections.

5. A conveyor belt according to claim 1, wherein said reinforcement means are comprised of a first fabric layer extending over said center section and a second fabric layer extending over said center section and said intermediate sections and at least partially into said end sections.

6. A conveyor belt according to claim 5, wherein said reinforcement means are further comprised of a layer of wire cables, extending over said end sections, for transmitting pulling forces.

7. A conveyor belt according to claim 5, wherein, when said oval tube is formed, said first reinforcement layer is radially outwardly positioned relative to said second reinforcement layer.

8. A conveyor belt for a tubular conveying device, said conveyor belt being comprised of a material selected from the group consisting of rubber and plastic material with rubber-like characteristics;
    said conveyor belt having embedded therein reinforcement means of materials selected from the group consisting of fabric and metal;
    said conveyor belt being guided within the conveying device such that said conveyor belt in its longitudinal direction forms an oval tube;
    said conveyor belt, in a direction transverse to said longitudinal direction, being comprised of a center section, a first and a second end section, with a first intermediate section being arranged between said first end section and said center section and a second intermediate section being arranged between said second end section and said center section, said first and second intermediate sections having a transverse bending resistance that is smaller than a bending resistance of said center section, and, when said oval tube is formed, said end sections forming an overlap portion having a bending resistance that is greater than said bending resistance of said intermediate sections, wherein said center section corresponds to 20 to 40% of the width of said conveyor belt, said intermediate sections together correspond to 15 to 25% of said width, and said end sections together correspond to 40 to 60% of said width.

9. A conveyor belt according to claim 8, wherein at least a portion of said end sections have a bending resistance that is greater than said bending resistance of said intermediate sections.

10. A conveyor belt according to claim 8, wherein said bending resistance of said intermediate sections is 45 to 70% of said bending resistance of said center section, and said bending resistance of said portion of said end sections is 60 to 80% of said bending resistance of said center section.

11. A conveyor belt according to claim 8, wherein said center section corresponds to 30% of said width of said conveyor belt, said intermediate sections together correspond to 20% of said width, and said end sections together correspond to 50% of said width.

12. A conveyor belt according to claim 8, wherein said bending resistance of said intermediate sections is 55% of said bending resistance of said center section, and said bending resistance of said portion of said end sections is 65% of said bending resistance of said center section.

13. A conveyor belt according to claim 8, wherein said bending resistance of said end sections, over their entire width in said transverse direction, is greater than said bending resistance of said intermediate sections.

14. A conveyor belt according to claim 8, wherein said end sections are comprised of an outwardly oriented portion and a portion adjacent to said intermediate sections, said outwardly oriented portion having a smaller bending resistance than said portion adjacent to said intermediate sections.

15. A conveyor belt according to claim 8, wherein said reinforcement means are comprised of a first fabric layer extending over said center section and a second fabric layer extending over said center section and said intermediate sections and at least partially into said end sections.

16. A conveyor belt according to claim 15, wherein said reinforcement means are further comprised of a layer of wire cables, extending over said end sections, for transmitting pulling forces.

17. A conveyor belt according to claim 15, wherein, when said oval tube is formed, said first reinforcement layer is radially outwardly positioned relative to said second reinforcement layer.

* * * * *